Patented Sept. 20, 1938

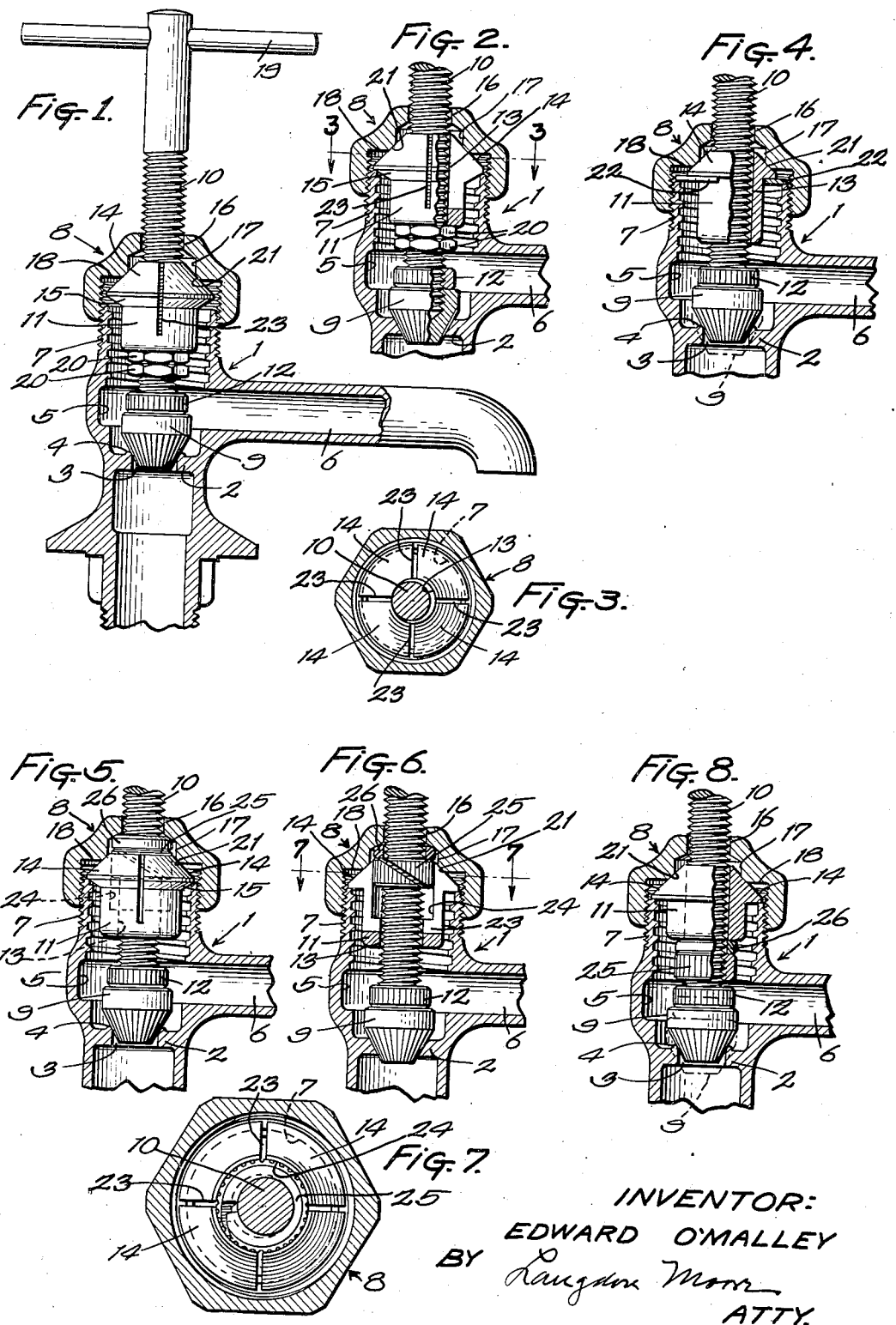

2,130,506

UNITED STATES PATENT OFFICE 2,130,506

MEANS FOR RESURFACING VALVE SEATS

Edward O'Malley, Chicago, Ill.

Application March 5, 1935, Serial No. 9,445

4 Claims. (Cl. 90—12.5)

This invention relates to improvements in method and means for resurfacing valve seats, and more particularly to providing conical seats concentric to the axis of the valve stem.

It is an object of this invention to provide a method and an improved reaming tool particularly adaptable for providing conical seats in valves, such as domestic water faucets, having an internally screw threaded portion or bonnet engaged by the valve stem and an external cap nut, or gland, through which the valve stem freely passes.

It is common practice to cast such valves and faucets of relatively soft metal with deep rectangular internal threads for engagement with the valve stem to reciprocate the valve head, as well as to cast the cap nut, or gland, internally screw threaded to be threaded upon the exterior upper portion of the valve casing or bonnet and to provide the interior of such cap, or gland, with an annular recess concentric with and surrounding the aperture through which the valve stem freely passes to receive and retain the packing.

In valves of this character, it is not only necessary to ream the conical seat concentric with the axis of the valve stem, but also center the reaming tool with all parts clear of engagement with the internal stem engaging threads as these threads are easily upset or defaced which would prevent the valve stem from being replaced after the seat had been reamed. This invention contemplates the provision of a reaming tool provided with a centering guide coacting with the interior of the cap nut and upper end of the casing or bonnet upon which the cap nut is threaded.

With these and other objects in view, reference is made to the accompanying sheet of drawings which illustrate preferred forms of this invention with the understanding that minor changes may be made without departing from the scope thereof.

In the drawing:

Figure 1 is a view partly in elevation and partly in longitudinal, vertical central section taken through a commercial domestic water faucet illustrating one form of this invention, before the reaming operation is initiated.

Figure 2 is a fragmentary view smilar to Figure 1 illustrating another embodiment of this invention when the reaming operation is completed.

Figure 3 is a view in horizontal section taken on the line 3—3, Figure 2, looking in the direction of the arrows.

Figure 4 is a view similar to Figure 2 showing an adaptation of the form illustrated in Figure 2, before the reaming operation has been initiated.

Figure 5 is a fragmentary view similar to Figure 1 of another embodiment of this invention illustrating the position of the parts prior to initiating the reaming operation.

Figure 6 is a view similar to Figure 5 showing the position of parts at the completion of the reaming operation.

Figure 7 is a view in horizontal section taken on the line 7—7, Figure 6, looking in the direction of the arrows.

Figure 8 is a view similar to Figure 5 illustrating a further modification of this invention.

The drawing illustrates the various embodiments of this invention to a commercial type of domestic water faucet including a casing 1 having a transverse diaphragm 2 above the water inlet provided with a central circular opening 3 having an annular valve seat 4 about the upper circumference thereof. A chamber 5 is formed thereabove with a water discharge 6 leading from one side and is extended centrally upward to form an internally threaded valve stem engaging portion 7 which is externally threaded at its upper end to receive a cap nut, or gland, 8 of commercial form.

This invention contemplates the provision of a tool for resurfacing the valve seat provided with a reaming member 9, for dressing or resurfacing said seat, mounted upon one end of a threaded reamer spindle 10 of a diameter not greater than the valve stem of the faucet and a centering member 11 adapted to center the reamer spindle 10 in the axis of the valve stem of the valve.

The reaming member is preferably of cylindrical form and, as illustrated, is provided with a depending conical milled, or knurled, reaming surface and with an upper flat surface having a central threaded recess to be threaded upon the lower end of the spindle 10 and is preferably secured in place therein by a lock nut 12.

The centering member 11 is preferably of cylindrical formation of less diameter than the diameter of the internally threaded portion 7 encountered in the majority of commercial faucet casings and is provided with an axial bore 13 to freely receive the spindle 10. The upper end of the centering member 11 is provided with an enlarged concentric annular centering head having an upper conical surface 14, which preferably meets the bore 13 at an angle of approximately forty-five degrees and with a lower surface 15 preferably of similar conical formation to meet the circumference of the member 11 at a similar angle. The greatest diameter of the centering head is sufficient to cause the under surface 15 to engage the top of the said portion 7 of the majority of commercial faucet casings and be received within the cap nut 8 mounted thereon.

As heretofore stated, the customary cap nut, or gland, 8 is provided with a central circular opening 16 for freely receiving the stem of the valve which opening is interiorly enlarged to provide a concentric recess 17 to receive the packing for the valve stem.

The opposite end of the cap 8 is centrally counter sunk and interiorly screw threaded to be threaded about the exterior of the upper end of the portion 7 of the valve casing with the surface 18 formed thereby customarily perpendicular to the side walls of the packing receiving recess 17.

In the carrying out of this invention, it is first necessary to remove the cap 8 with the valve stem, not shown, from the valve casing, then remove the valve stem from the cap 8 and insert the upper end of the reaming spindle 10 through the under side of the cap 8 to pass through the opening 16 therein, and attach an operating handle upon the upper end of the spindle 10, such as the pin 19 passed through the spindle, as shown in Figure 1.

In the form illustrated in Figure 1, the centering member 11 is so adjusted by lock nuts 20 that when the reaming tool mounting the cap 8 is inserted within the valve casing with the conical end of the reamer 9 centered in the seat opening 3 and the threads of the cap 8 initially engaged to the upper threaded end of the portion 7 of the casing the conical surface 14 of the centering head will be in contact with the circular abutment 21 formed by the meeting of the surface 18 and walls of the recess 17 in the cap 8, which abutment may in practice be or become beveled, as shown, which centers the member 11 and thereby the axis of the spindle 10. A rotary motion with pressure is applied to the handle 19 to cause the reaming surface of the reamer 9 to resurface the valve seat and the reamer is advanced against the seat by the threading of the cap 8 upon the portion 7 of the casing as the resurfacing progresses until the under surface 15 of the centering member head engages the top of the portion 7 at the end of the operation, as shown in Figure 2.

A slightly different form of centering member is shown in Figure 4 in operating position. As illustrated, the head of the centering member may be of less diameter than the interior of the portion 7 of the casing, and if, desired, the under surface 15 of the head may be perpendicular to the bore 13. In such a case, one or more washers or perforated plates 22 of sufficient diameter to engage the top of the portion 7 of the valve casing are placed about the body portion of the centering member 11 and when the tool is in operating position the cap 8 is threaded upon the casing to cause the abutment 21 to firmly engage the conical surface 14 to center the member 11 and hold the said member against the washer 22 and thereby against the top of the casing. In this form the member 11 is centered within the casing by the contact of the abutment upon the cap with the conical surface of the centering member and the reaming spindle is centered by the bore 13 within the member 11, and the lock nuts 20 are omitted. The reamer 9 is advanced against the seat by pressure applied upon the handle 19. It is preferable to provide the centering member 11 with two or more oppositely disposed slots 23 extending through to the bore 13 from the upper portion of the conical surface 14 to adjacent the bottom of said member, as shown in Figures 2 and 3, whereby increased pressure upon threading the cap on the casing will restrict the bore 13 to snugly but freely embrace the spindle 10 to perfect the centering thereof, and when the bore 13 becomes worn from service.

Figures 5 to 8, inclusive, illustrate the centering member held securely between the cap 8 and top of the portion of the casing 7 by engagement of the head of the member 11 therebetween and in which means is provided to automatically advance the reamer upon the seat when rotated in one direction. To produce this automatic action, the upper portion of the centering member 11 is recessed to provide a chamber 24 having walls parallel to the axis of the bore 13 of sufficient diameter to receive a floating feed nut 25 threaded upon the spindle 13. The floating feed nut 25 may be split and may be knurled, if so desired, as shown in Figures 6 and 7. A fibre or leather washer, or friction member 26 is mounted within the packing recess 17 within the cap 8 through which the spindle freely passes.

In operation, the parts are adjusted as shown in Figure 5, and the handle 19 of the reamer spindle is rotated, and the cap 8 alternately rotated, first in one direction and then in the other direction to alternately grip the feed nut 25 to advance the spindle 10. The centering member 11 is stationary and through the slots 23 caused to frictionally engage the floating feed nut 25. The rotation of the spindle always in one direction causes the nut 25 to advance upward on the spindle 10 and frictionally engage the washer and the spindle is advanced therethrough to ream the seat.

It has been found that the same result may be obtained by placing the feed nut 25 upon the spindle 10 between the reamer 9 and centering member 11 with the friction washer 26 interposed between the top of the nut 25 and bottom of the member 11.

Good results may also be obtained by using a flat reamer when absolute centering is not necessary, by using feed nut 25 upon the spindle 10 between the flat reamer and the bottom of the packing nut 8, with a friction washer interposed between the top of the feed nut and the bottom of the packing nut, or the packing may be left in the inside of the packing nut 8 and the feed nut 25 comes into contact with one of the packing washers with the friction washer interposed between. If sufficient lubricant is used, the friction washer may be left out entirely.

What I claim is:

1. In a tool for resurfacing the seats of valves, including the combination of a threaded spindle having a reamer secured at one end adapted to be substituted for the normal valve stem and freely mounting a centering and guiding member adapted to be engaged and immovably held between the normal cap nut and top of the valve casing normally engaged thereby, with means including a feed nut threaded upon the spindle having frictional engagement with the cap nut to advance the reamer upon the seat upon rotation of the reamer spindle in one direction, said centering and guiding member provided with a conical surface which when the cap nut is advanced upon the casing will be engaged by the interior of the cap nut to center the device to guide the spindle in the axis of the normal valve stem, and the upper surface of the said member recessed to snugly receive the said feed nut to cooperate with the body of the centering device to center the spindle.

2. The structure of claim 1 wherein the centering and guiding member is provided with a cylindrical body free of contact with the interior of the valve casing having an enlarged head of greater diameter than the casing when the cap nut is advanced upon the casing will be engaged by the interior of the nut to center the device to guide the spindle in the axis of the normal valve stem, and wherein the upper surface of the centering device is recessed to snugly receive the said feed nut threaded upon the spindle to cooperate with the body of the centering device to center the spindle.

3. The structure of claim 1 wherein the centering and guiding member is provided with a conical surface which when the cap nut is advanced upon the casing will be engaged by the interior of the cap nut to center the device to guide the spindle in the axis of the normal valve stem, and wherein the upper surface of the centering member is recessed to snugly receive the said feed nut threaded upon the spindle to cooperate with the body of the centering device to center the spindle, and wherein a friction washer is mounted upon the spindle within the cap nut for engagement with the upper surface of the feed nut.

4. In a tool for resurfacing the seats of valves, including the combination of a threaded spindle having a reamer secured at one end adapted to be substituted for the normal valve stem and freely mounting a recessed centering and guiding member adapted to be engaged and immovably held between the normal cap nut and top of the valve casing normally engaged thereby, a feed nut threaded upon the spindle received within said recessed member and having frictional engagement with the cap nut, and a friction washer mounted within the cap nut for engagement with the feed nut to automatically advance the reamer upon the seat upon rotation of the reamer spindle in one direction.

EDWARD O'MALLEY.